C. HORTON & A. M. HENRY.
SHOOTING GALLERY.
APPLICATION FILED JULY 21, 1914.

1,193,462.

Patented Aug. 1, 1916.
6 SHEETS—SHEET 4.

Witnesses:
J Clyde Ripley
R. Teasdee

Charles Horton
Augustus M. Henry
Inventors
Augustus M. Henry
By their Attorney

C. HORTON & A. M. HENRY.
SHOOTING GALLERY.
APPLICATION FILED JULY 21, 1914.

1,193,462.

Patented Aug. 1, 1916.
6 SHEETS—SHEET 5.

Witnesses:

Charles Horton
Augustus M. Henry
Inventors
By their Attorney
Augustus M. Henry

UNITED STATES PATENT OFFICE.

CHARLES HORTON, OF NEW YORK, AND AUGUSTUS M. HENRY, OF LARCHMONT, NEW YORK; SAID HORTON ASSIGNOR TO SAID HENRY.

SHOOTING-GALLERY.

1,193,462.

Specification of Letters Patent. Patented Aug. 1, 1916.

Application filed July 21, 1914. Serial No. 852,193.

*To all whom it may concern:*

Be it known that we, CHARLES HORTON and AUGUSTUS M. HENRY, citizens of the United States of America, and residents of, respectively, the borough of Brooklyn, in the county of Kings, city and State of New York, and Larchmont, in the county of Westchester, State of New York, have invented certain new and useful Improvements in Shooting-Galleries, of which the following is a specification.

This invention relates to games of skill, and more particularly aims to provide an embodiment adapted for use in a shooting gallery, although it is expressly to be understood that the invention broadly contemplates means the functioning of which may be caused by the use of any missile.

An important object of the present invention is to disclose an embodiment thereof which shall be characterized by an ability to reproduce the essential features of any known game or contest, such as baseball, football or the like, in a shooting gallery or the like so constructed that any person may exercise his skill or aim, in connection therewith, to effect a recordation of various characteristic features of the particular game thus embodied.

An exceedingly important object of the invention is to provide a permanently located target, the striking of which or any segment of which, by a missile, being adapted to cause, through the provision of appropriate means, an automatic recordation of the characteristic features aforesaid.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification and wherein are shown a possible embodiment of this invention adapted to be used as a shooting gallery substantially in accordance with the rules of the game of baseball;
Fig. 3 is a vertical sectional view of said embodiment, certain of the parts being shown in elevation and certain of the parts being shown partially in elevation and partially broken away.

Similar reference characters refer to similar parts throughout the several views of the drawings.

Referring now particularly to the disclosure of Figs. 1 to 12 inclusive, the reference numeral 15 represents a supporting frame or main casting. The general structure is maintained upright by means of the presence of said main frame, the presence of an auxiliary wall-member 16 and the presence of the nine tie-rods 17, 18, 19 and 20 which rigidly connect said main frame and said wall-member and serve to space said wall-member predeterminedly in front of said main-frame. Fixedly mounted upon the main-frame as upon bosses 15$^a$ is a vertically arranged circular tracker-member 21, the front vertical face of which member serves as a permanently located track over which continuously rides the three idlers 22 while the wheel 23 which carries these idlers is continuously rotating. (See particularly Fig. 3). It is important from the outset and at all times to remember that this wheel 23, as well as the driving sleeve 24, and the parts which as hereinafter described are carried thereby, are continuously rotating.

Figure 3:
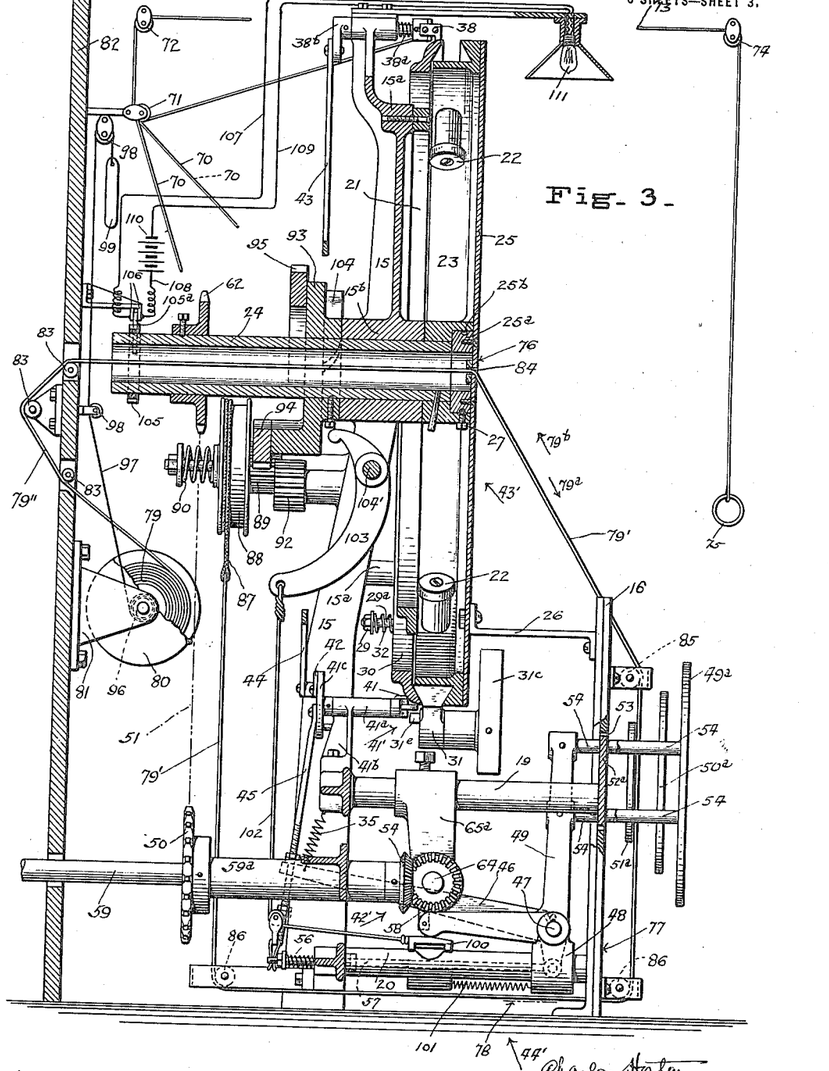

The hub-portion 23$^a$ of wheel 23 is provided with a main bore (which as shown in Fig. 3 is of equal diameter to the bore formed through the hub-portion 15$^b$ of the main-frame 15,) and is also provided with a counter-bore which is disclosed in said Fig. 3 as loosely accommodating therein a short shaft 25$^a$. This short shaft is fixedly carried upon the rear face of the anchored circular shield 25. Shield 25 has as its main function to act as a missile-proof protector for the parts located in rear thereof; and it may also serve to afford a background upon which may be inscribed a diagrammatic representation of a base-ball diamond. (See Fig. 1). The service last-mentioned makes preferable the anchorage of this shield,—for which purpose the companion brackets 26 (but one of which brackets, and that one in Fig. 3, being disclosed) are provided. This shield, although itself fixed as aforesaid, is additionally supported by the continuously rotating wheel 23, for the short shaft 25$^a$ is provided with an annular groove 25$^b$ and within this groove extend the stud-ends carried by three annularly equidistant screws (one of said screws being disclosed at 27 in Fig. 3) which are threaded into said wheel's hub 23$^a$.

Figures 4, 5, 6, 10, 11:
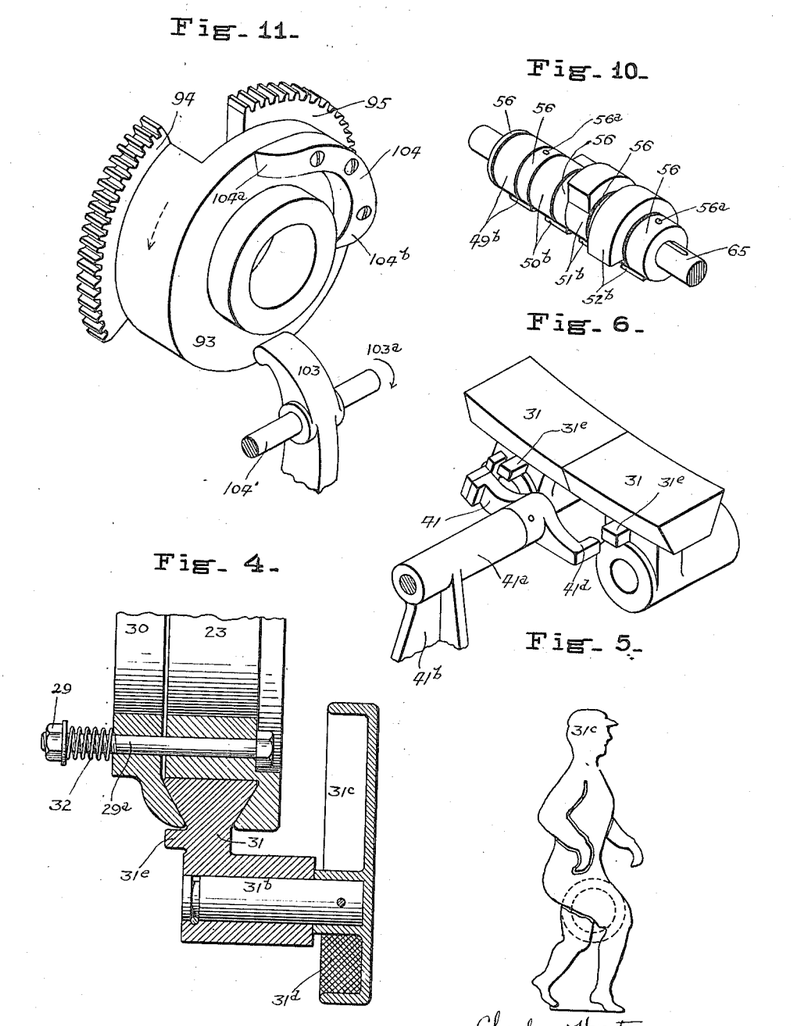
Fig. 4 is an enlarged detail view, showing one of the "base-runner"-supporting members 31, one of the spindles 31$^b$, one of the manikins 31$^c$, one of the nuts 29, one of the bolts 29$^a$, one of the expansile springs 32, a portion of revoluble wheel 23, and a portion of clutch-ring 30.
Fig. 5 is an enlarged detail view showing in front elevation one of said manikins 31$^c$.
Fig. 6 is an enlarged detail view showing in perspective the "home-plate" latch 41 and certain of its associated parts, as the same would be viewed as indicated by the arrows 41' shown in Figs. 2 and 3, the disk 41$^c$ being removed for purposes of clarity.
Fig. 10 is an enlarged detail view, showing in perspective the cam-shaft 65 and its associated parts, as they would be viewed as indicated by the arrows 42' shown in Figs. 2 and 3.
Fig. 11 is an enlarged detail view, showing in perspective mount 93 and its associated parts, as the same would be viewed as indicated by the arrows 43' shown in Figs. 2 and 3.

Wheel 23 has fixedly mounted thereon, arranged rearwardly of its rim, and attached by means of the six bolts 29 and the coöperant nuts 29$^a$ (see Figs. 2, 3 and 4), a clutch-ring 30. The peripheral outer surfaces of wheel 23 are formed as shown in Figs. 3 and 4, and the peripheral outer surfaces of the associated clutch-ring 30 are formed as also shown in said figures; there being thus established between said wheel and its ring an annular groove having the doubly undercut cross-section disclosed. The base-portions 31$^a$ of four "base-runner"-supporting members 31 are adapted to lie within said annular groove; and, the nuts 29 having been adjusted sufficiently to make suitable the compression of expansile springs 32, friction will cause the continuous rotation of wheel 23 and clutch-ring 30 as one unit to transport with them all the members 31 which are not halted by means of one of the latches 39, 38, 40 and 41. Each member 31 consists in the main of a horizontally arranged sleeve within which is rotatively journaled a spindle 31$^b$. Upon the end of each spindle which extends forwardly of its member 31 is fixedly mounted a suitably designed manikin or base-runner 31$^c$. (See particularly Figs. 4 and 5). Each of these base-runners is preferably loaded with a mass of material 31$^d$ located below the center of spindle 31$^b$ and of such a weight that the base-runner will always hang upright. Each member 31 (see Figs. 4 and 6) carries a horizontally and rearwardly offset lug 31$^e$ adapted to coöperate with any of the said latches 39, 38, 40 and 41.

Figure 1:
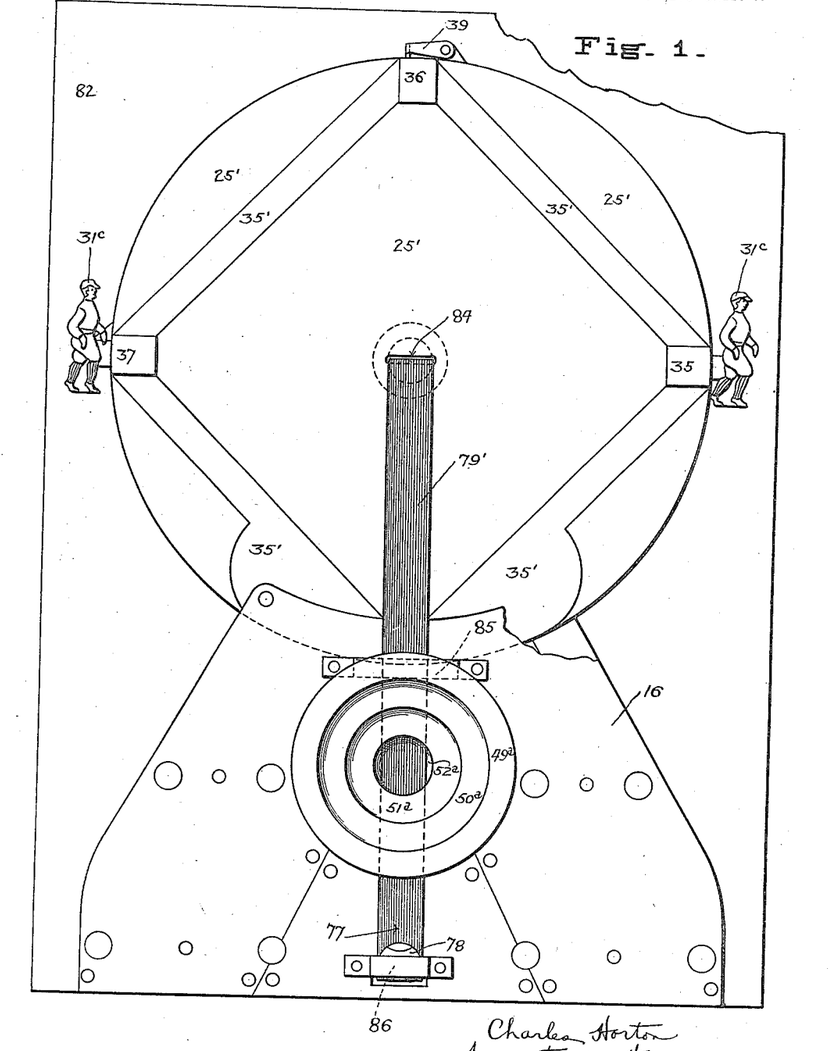
Figure 1 is a front elevation of said embodiment.
Figure 2:
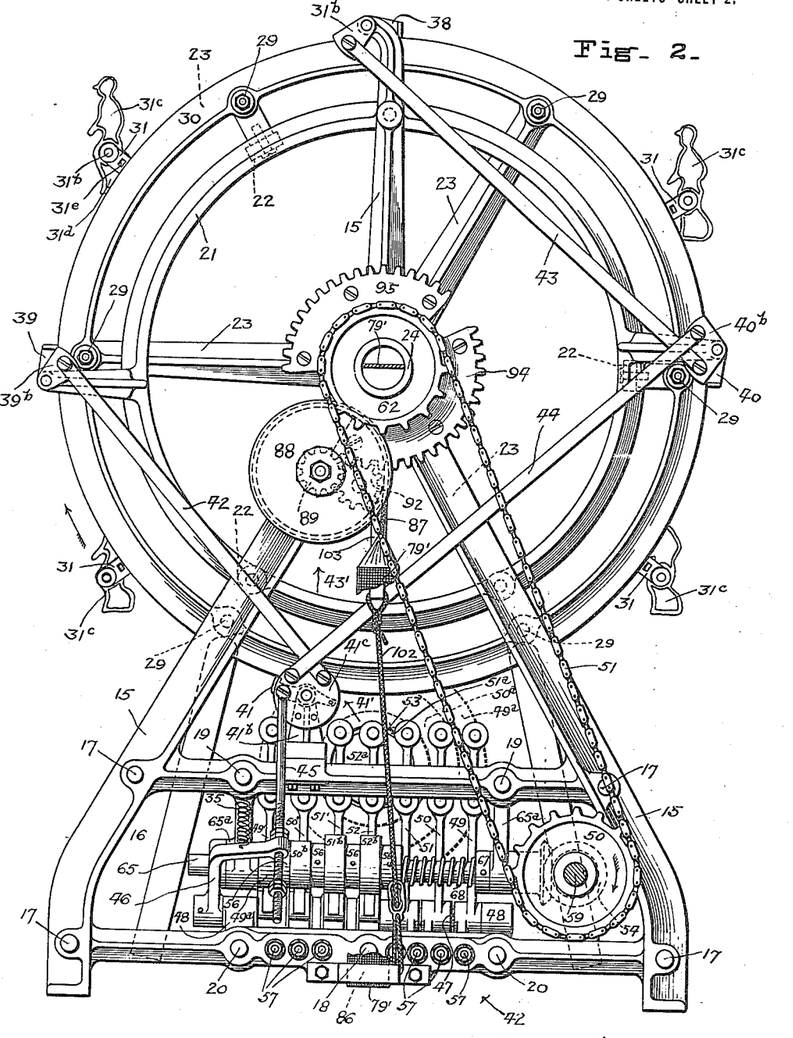
Fig. 2 is a rear elevation thereof.
Figure 7:
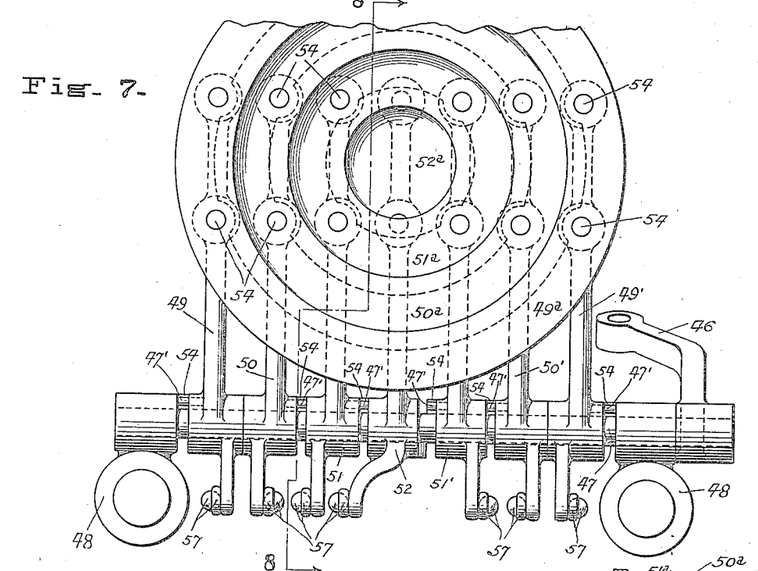
Fig. 7 is an enlarged detail view, showing the segments of the permanently located target and certain of their associated parts, as the same would be viewed from in front.
Figures 8, 9, 12:
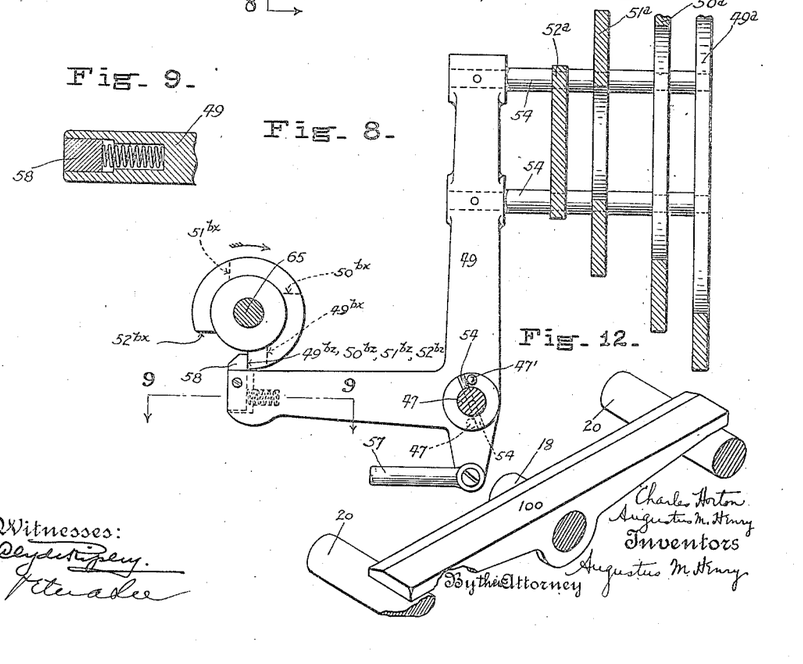
Fig. 8 is a sectional view, taken on the line 8—8 of Fig. 7.
Fig. 9 is a horizontal sectional view, taken on the line 9—9 of Fig 8.
Fig. 12 is an enlarged detail view, partially broken away, illustrating in perspective the lock-bar 100 and certain of its associated parts, as the same would be viewed as indicated by the arrow 44' shown in Fig 3.
Figures 13, 14, 15, 16:
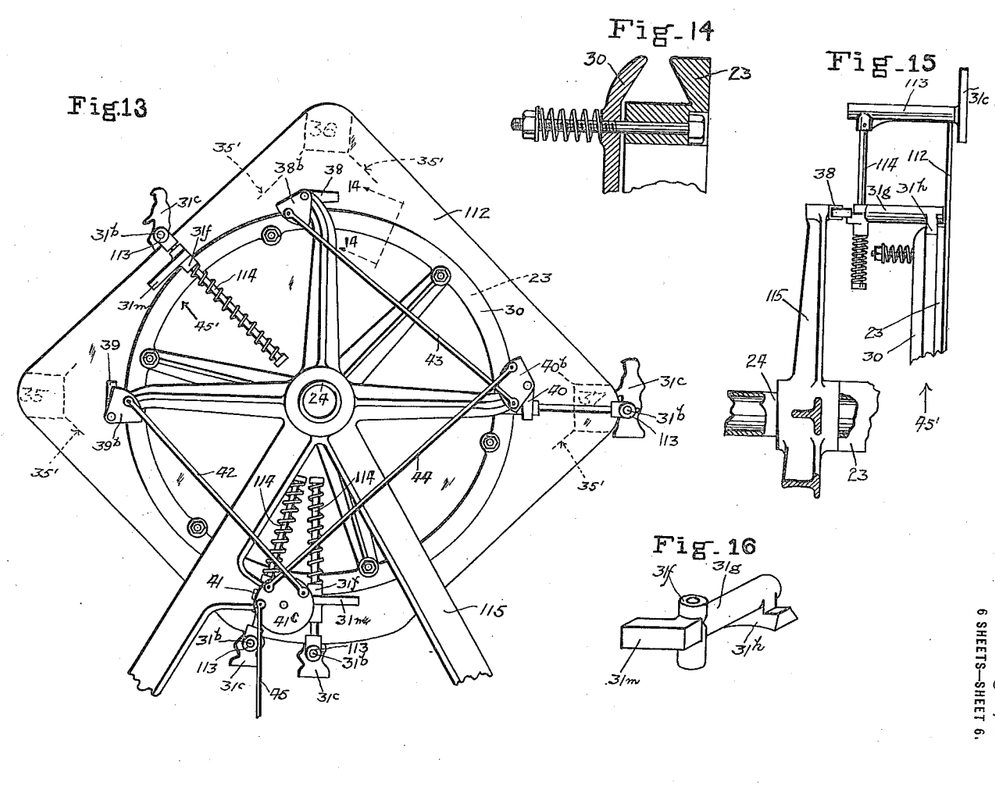
Fig. 13 is a rear elevation, partially broken away, showing a possible adaptation of the present embodiment so designed as to cause the more important travels of manikins 31$^c$ to be in straight paths, rather than in arcuate paths, as would be the case were the present embodiment constructed in accordance with the disclosure of Figs. 1 to 12 inclusive.
Fig. 14 is an enlarged detail sectional view, taken on the line 14—14 of Fig. 13.
Fig. 15 is a side elevation of certain of the parts shown in Fig. 13, said view being partially in section and partially broken away.
Fig. 16 is an enlarged detail view, showing in perspective one of the "base-runner"-supporting members 31$^c$ as the same would be viewed as indicated by the arrows 45′ shown in Figs. 14 and 15.

Referring for the moment particularly to Fig. 1, let us assume that the "base-point" delineation 35 represents "first-base", the "base-point" delineation 36 represents "second-base" and the "base-point" delineation 37 represents "third-base"; and that the "home-plate" is located somewhere in rear of wall-member 16. The second-base latch 38 is keyed upon and normally spring-pressed toward the front end of a spindle 38$^a$ journaled within a boss formed upon the main-frame 15 (see Fig. 3); the first base-latch 39 and the third-base latch 40 being each similarly keyed and spring-biased upon a similar spindle, these just-mentioned spindles being each journaled within a suitable base formed upon tracker-ring 21. (See Fig. 2). The "home-plate" latch 41 is merely fixedly mounted upon one end of a suitable spindle journaled within a boss 41$^a$ (see Figs. 2, 3 and 6) formed upon a bracket 41$^b$ carried by main-frame 15. This latch 41, unlike the other latches, carries as best shown in Fig. 6 (the disk 41$^c$ to be referred to in a moment being omitted in this figure) an auxiliary latch-tooth 41$^d$. The first-base spindle has fixedly mounted upon its rear end an offset arm 39$^b$, the second-base spindle has fixedly mounted upon its roof end an offset arm 38$^b$, the third-base spindle has fixedly mounted upon its rear end an offset segment 40$^b$, and the home-plate spindle has fixedly (and concentrically) mounted upon its rear end a disk 41$^c$. Arm 39$^b$ and disk 41$^b$ are connected as shown by a link 42, arm 38$^b$ and segment 40$^b$ are connected as shown by a link 43, and segment 40$^b$ and disk 41$^b$ are connected as shown by a link 44. (See Figs. 2 and 3). A link-bar 45 is at one end pivotally connected with said disk, and at its other end said link-bar is adjustably connected as shown with the free terminus of a rocker-arm 46 fixedly carried by the rock-shaft 47. (See Figs. 2, 3 and 7). Rock-shaft 47 is loosely journaled within the sleeve-blocks 48 which are supported by the tie-rods 20, and upon this rock-shaft are seven loosely pivoted target-segment supporting levers (see Figs. 1, 2, 3, 7 and 8); levers 49 and 49' supporting the what may be termed here "one-base-hit" segment 49$^a$; levers 51 and 50' supporting the what may be termed "two-base-hit" segment 50$^a$; levers 51 and 51' supporting the what may be termed here "three-base-hit" segment 51$^a$, and lever 52 supporting the what may be termed here "home-run" segment 52$^a$. These segments are established in spaced relation, and overlappingly of the hole 53 formed in wall-member 16, as best shown in Fig. 3; each of the segments being fixedly mounted upon its supporting lever or levers by means of the illustrated rigid rods 54. Now, it is important in this embodiment that when any target-segment is struck by a missile it will rock its own supporting lever or levers (and only its own supporting lever or levers), and yet at the same time operate rocker-arm 46 thereby to rotate disk 41$^c$ and consequently abnormally open the four latches controlled thereby. These ends are here accomplished in the following manner: As aforesaid, rocker-arm 46 (Figs. 2 and 3) is fixedly mounted upon rock shaft 47. Each of the target-segment supporting levers (Figs. 7 and 8) carries offset from its hub-portion a stud 47' which coöperates with an abutting stud 54 carried by rock shaft 47 (Figs. 7 and 8). There are of course seven of these studs, as shown best in Fig. 7, the stud 54 associated with lever 52 being located out of alinement with the other studs 54 as shown in Figs. 7 and 8. It will be seen that upon a rocking of any one of said target segment supporting levers, say upon a rocking of the lever 49, in an anti-clockwise direction (relatively of Fig. 8) about shaft 47, due to the impinging of a missile against say the segment 49$^a$, the stud 47' shown in full lines in Fig. 8 will necessarily move with the lever 49 which carries it and said stud 47', by bearing against the stud 54 shown in full lines in said Fig. 8, will cause a like anti-clockwise rotation of shaft 47 sufficient to depress rocker-arm 46. Of course simultaneously with the rocking of lever 49, lever 49' will rock (Fig. 7). Rocker arm 46 will thus operate with and as a temporary extension of levers 49 and 49', but without and relatively of all the other target segment supporting levers. This is important as will appear in the next two paragraphs hereinafter. When such an operation of rocker arm 46 occurs, no matter which one of the four target segments it is that causes a functioning of its appropriate stud 54, a downward pull is exerted on link-bar 45. Thereupon the four latches 39, 38, 40 and 41 are "opened", that is, each of said latches, relatively of Fig. 2, is swung clockwisely so as to clear the arcuate path of travel which, concentric with the periphery of wheel 23, may be traversed as herein described by the lugs 31$^e$ of the four base-runners 31. At the commencement of a series of efforts by a contestant, all the base-runners are collected rightwardly (relatively of Fig. 2) of latch 41. This latch 41 is quite important, and is additionally shown in perspective, as when viewed in the direction of the arrow 41' of Fig. 2, in Fig. 6. In Fig. 6 the pertinent parts of two of the four base-runners 31 are shown; and these pertinent parts may readily be identified by glancing at Fig. 4. Now only one (but always one) of said base-runners is desired to be released from its latch 41 upon every downpull of link-bar 45, no matter which one of the four target segments is struck. So, upon each downpull of the link-bar, auxiliary latch-tooth 41$^d$ moves clockwisely abnormally to intersect the aforesaid arcuate path of travel of the four base-runners 31. The result is that while latch 41 acts to release the base-runner formerly halted therebehind, latch-tooth 41$^d$ acts to intercept the lug 31$^e$ of the next-following base-runner. When, thereafter, and as hereinafter explained in said two paragraphs following, all latches are permitted to and do return to normal, the base-runner 31 which was just previously halted by auxiliary tooth 41$^d$ now passes beyond the latter to become halted by latch 41 until a target segment is again struck. The retractile spring 35 tends to maintain rocker-arm 46 and rock-shaft 47 in their normal positions. (See Figs. 3, 7 and 8). And seven expansile springs 56 (one of which is clearly disclosed in Fig. 3 and each of which is coiled about a rod 57 attached as best shown in Figs. 3, 7 and 8 to one of the target-segment-supporting levers) serve to bring into abutment each stud 54 and its associated stud 47', thereby to maintain the target-segments in their normal dispositions.

Of the levers 49, 49', 50, 50', 51, 51' and 52, each of the levers 49', 50', 51' and 52 is, while each of the levers 49, 50 and 51 is not, provided with a pivoted spring-urged tooth 58. (See particularly Figs. 8 and 9.) It will thus be seen that at least one supporting lever for each of the target-segments is provided with such a tooth.

And next to describe the relationships and characteristics of dissimilar cams $49^b$, $50^b$, $51^b$ and $52^b$, with one of which cams each of said teeth 58 predeterminedly coöperates. A main driving shaft 59 is journaled within a bearing $59^a$ formed on the main frame (see Fig. 3); this shaft fixedly carrying a sprocket 50 which drives a chain 51 (see Fig. 2) that passes over a sprocket 62 fixedly mounted upon a revoluble sleeve 24. Main driving shaft 59 fixedly carries a beveled gear 54 adapted to mesh with a similar gear fixedly carried by cam-shaft 65 that is loosely journaled within blocks $65^a$ rigidly suspended from tie-rods 19. It will thus be seen that since the main driving shaft 59 is continuously rotating, the wheel 23 is continuously rotating and also the cam-shaft 65 is continuously rotating a complete revolution of each, as the parts are now designed, requiring the same interval of time. And yet, as an examination of the drawings will disclose, to the eye of a spectator or contestant (provided a missile cast by him has not recently struck and displaced one of the target-segments) the fact of the continuous actuations just described is undiscovered.

The four cams adverted to in the preceding paragraph are loosely mounted upon cam-shaft 65, and a plurality of spacing or friction-collars 56 are arranged on the said cam-shaft as disclosed in Figs. 2 to 10. Cam-shaft 65 is provided with a longitudinally extending key-way, and each of said collars carries a key-pin $56^a$, all of the key-pins coöperating with said key-way. (See said Figs. 2 to 10.) The cam-shaft carries a fixed collar 67 and an expansile spring 68 as best shown in Fig. 2. In Fig. 8, the four cams are most clearly disclosed—as they would be located when normally arranged, that is, when each of the four teeth 58 is in a latch-engagement with its appropriate cam and is thus holding the latter fast against rotation, despite the preferably strong clutching action imparted to friction-collars 56 by means of the spring 68, a clutching action that would normally cause said cams to be rotated along with the continuously rotating cam-shaft 65. As thus held fast (and now see Fig. 8), all the cam-fronts $49^{bz}$, $50^{bz}$, $51^{bz}$ and $52^{bz}$ are arranged in line (each in engagement with its adjacent tooth 58); the cam-rear of cam $49^b$ being located as indicated at $49^{bx}$, the cam rear of cam $50^b$ being located as indicated at $50^{bx}$, the cam rear of cam $51^b$ being located as indicated at $51^{bx}$, and the cam rear of cam $52^b$ being located as indicated at $52^{bx}$. It is therefore plain that the instant a target-segment is struck by a missile, thereby to cause its supporting lever or levers to rock on end-shaft 47 sufficiently to permit friction to carry past the thereby abnormally disposed tooth 58 the cam-front of the appropriate cam, the said target-segment just-mentioned must remain in abnormal location until the cam-shaft causes the cam-rear of said associated cam to pass beyond said tooth. While the said target-segment is thus abnormally depressed, the four latches 39, 38, 40 and 41 are by means of rocker arm 46, maintained open. Thus (were those parts, not yet referred to but visible in the drawings and immediately to be described, not present) the instant a target segment is struck by a missile one or more manikins $31^c$ commence to travel with wheel 23, to be transported with said wheel until such time, as subsequent to a closing of all of said latches by a return of the abnormally depressed target-segment to its normal location as aforesaid, each of said manikins is brought in abutment with one of the closed latches. On account of the aforementioned design of the respective cams, such an abutment will take place, in the case of a displacement of the "one-base-hit" target-segment $49^a$, after a manikin has been transported a sufficient distance to clear the particular latch against which it was previously blockaded and yet a distance not sufficient to carry said manikin beyond the latch next in advance; in the case of the displacement of the "two-base-hit" target-segment $50^a$, after a manikin has been transported a sufficient distance to clear the latch against which it was previously blockaded and also the latch next-in-advance and yet not a distance sufficient to carry said manikin beyond the latch second-in-advance; in the case of a displacement of the "three-base-hit"-target-segment $51^a$, after a manikin has been transported a sufficient distance to clear the latch against which it was previously blockaded and also the next two latches in advance thereof and yet not a distance sufficient to carry said manikin beyond the third-in-advance latch; and in the case of the "home-run" target-segment $52^a$, after a manikin has been transported a sufficient distance to clear the latch against which it was previously blockaded and also the three latches next in advance thereof and yet a distance not sufficient to carry said manikin beyond the fourth-in-advance latch. It will also be clear that any manikin which has been previously transported to lie in abutment against either of the latches 39, 38 and 40, will not, after being transported to the home-plate latch 41, pass said home-plate latch no matter how long a struck target-segment is maintained displaced, until one of said target-segments is again struck and displaced. For it is clear that the necessary opening of all the latches (by means of rocker-arm 46) which takes place upon the striking of any target-segment, places a barrier, not only in the path of any manikin which is being transported toward the home-plate latch but also in the path of any manikin or manikins in rear of the manikin first-mentioned; this barrier consisting of the auxiliary tooth 41ᵈ carried by home-plate latch 41. (See Fig. 6.)

Assume that the "bases become filled," say by a series of "one-base-hits;" then it will be that three manikins are "on base" and that the fourth manikin is restrained immovable by home-plate latch 41; now assume that a "home-run hit" is made; thereupon all the four latches are opened and held open, the fourth manikin making a complete circuit of the bases and the said three "on base" manikins coming in ahead of said fourth manikin. These four manikins, then, will all pile up behind the abnormally disposed auxiliary tooth 41ᵈ (see Fig 5),—the main tooth of the home-run latch 41, upon said latch finally returning to normal location, becoming established as a suitable barrier to prevent said four manikins from emergence from behind wall-member 16. It will also be obvious that the piled up manikins will be invisible, to spectator or contestant. In one sense, these piled up manikins may be said to be "on the bench" and awaiting their "turn at bat." It will be seen that, no matter whether none or one or more of said manikins be located at a particular "base-point" or at several "base-points," a striking of any target segment will cause each manikin which is located in abutment against any one of the four latches to advance a number of bases equal to the "base-quantitative" value of the struck target-segment, and it will also thus be seen that one and only one manikin will ever, as the result of a single depression of any target-segment, issue from behind wall-member 16.

It may be desirable, when a contestant ceases his efforts and another contestant desires to try his skill in a situation wherein the four manikins are "on the bench," to "clear the bases" provided any manikins are "on base." It has previously been mentioned that the "first-base," "second-base" and "third-base" latches 39, 38 and 40 are maintained as to relative rotation fixedly upon their supporting spindles, and that said three latches, while spring-urged into the vertical plane through which travels the latch-coöperant lug carried by each of the manikins, are longitudinally movable upon their spindles to withdraw them from said plane. As indicated in Fig. 3, a cable 70 or the like is attached to each of the three latches 39, 38 and 40, these cables passing over an idler 71 and over an idler 72 to become united into a single cable as at the point 73. This single cable passes over an idler 74, which may be located a considerable distance in advance of the target-supporting structure, the single cable depending from said pulley 74 and carrying terminally a finger-ring 75 located within easy reach of a spectator or contestant. It will be seen that upon a downward pull upon finger-ring 75 the three latches 39, 38 and 40 may be manually opened, thereby to permit the continuously rotating wheel 23 to "clear the bases."

In order to render the contest more interesting, and perhaps more difficult, this invention also contemplates, in combination with the permanently located target which includes the four segments 49ᵃ, 50ᵃ, 51ᵃ and 52ᵃ, the provision of a moving target which shall, preferably at regular intervals, be caused to travel from one visible point on the structure, say that point which may be termed the "pitcher's box" 76 (see Figs. 1 and 3) to a point removed therefrom, say that point that may be termed the "catcher's position" 77 (see said Figs. 1 and 3)—in the course of said travel to pass within predetermined proximity to said permanently located target and preferably in front of one or more segments of the latter. (See Fig. 3.) It is also preferable that said moving target shall after each such travel retrace its path, and that the forward and reverse movements just-described shall alternate continuously and at regular intervals. It may be desirable, of course, so to design the parts that said moving target will predeterminedly halt or disappear for a predetermined interval of time at the conclusion of each of such alternate movements. This moving target is in the present instance existent in the form of a representation 78 as the delineation of a base-ball carried by a preferably flexible traveling belt 79, constructed of some suitable fabric such as canvas or other perforable material.

Belt 79 is preferably of a length sufficient (as indicated in Fig. 3) to provide a large number of reserve sections to be maintained wound upon a reel 80 revolubly journaled within a bracket 81 mounted upon a back-wall 82, to the end that when the section 79' of said belt has been shot full of holes or otherwise weakened or injured, one of said reserve sections may be brought into play to cause visible travels of a duplicate representation similar to the representation 78.

As best shown in Fig. 3, belt 79 passes from reel 80 over idlers 83, thence passes longitudinally through the interior of driving sleeve 24, thence passes through a slot 84 adjacent the point 76 formed transversely of shield 25 (see Figs. 1 and 3), thence over an idler 85, thence between target-segments 51ᵃ and 50ᵃ, thence over idlers 86, finally to have its free end connected to a cable 87 (see Figs. 2 and 3) adapted predeterminedly and alternately to be wound upon and unwound from a drum 88. The drum 88, and a pinion 89 to which said drum is fixedly attached, are loosely mounted upon a short shaft fixedly anchored in a boss formed on the main-frame 15, the free end of this shaft, as shown best in Fig. 3, being reduced for the support of an expansible spring 90. This spring, adjustably compressed between washers 91, places a friction drag upon said drum and consequently upon pinion 89. A pinion 92 is revolubly mounted in a boss formed on the main-frame 15, this pinion meshing with pinion 89, but not completely overlapping the same horizontally. (See Fig. 3).

Fixedly mounted upon driving sleeve 24 (see Figs. 2, 3 and 11) is a mount 93 having two arcuate horizontally spaced faces, upon one face being fixedly mounted a gear-segment 94 adapted to mesh with and rotate forwardly the pinion 89 during nearly the whole of one-half of each of the revolutions of sleeve 24, and upon the other face being fixedly mounted a gear-segment 95 adapted to mesh with and rotate forwardly pinion 92 during nearly the whole remaining one-half of each of said reolutions of sleeve 24. The diameter of drum 88 is preferably so designed that when pinion 89 is being forwardly rotated as aforesaid, a cable 87 is sufficiently wound upon the drum to cause the section 79' of belt 79 to move endwisely a proper distance in the direction of the arrow 79$^a$ (see Fig. 3) to advance the representation 78 from within the sleeve 24 to the location of said representation shown in Fig. 3, and that when pinion 92 is being rotated as aforesaid (thereby causing a reverse rotation of the intermeshed pinion 89), the cable 87 is sufficiently unwound from the drum to move endwisely said section 79$^b$ (see Fig. 3) to return the representation 78 to the interior of sleeve 24.

The spring 90, by means of placing a friction drag as aforesaid upon drum 88, prevents any over-motion of the latter at the beginning and termination of each meshing between a gear-segment and one of the pinions just-mentioned, thereby insuring against the possibility of such a gear-segment and its pinion not coming promptly and predeterminedly into mesh.

No matter how many reserve sections there may be at any time wound upon the reel 80, the section 79' of the belt 79 is always maintained taut by the following means: Fixedly attached to reel 80 for revolution therewith is a similar reel 96, around which is wound in the proper direction a cable 97. This cable after, passing over the idlers 98, serves to suspend a weight 99.

From the foregoing, it will be apparent that while there are continuously rotating the main driving shaft 59, the cam-shaft 65 (maintaining cams 49$^b$, 50$^b$, 51$^b$ and 52$^b$ in enforced readiness to hold open for a predetermined length of time aforesaid the latches 39, 38, 40 and 41 after a striking of a target-segment), the driving sleeve 24, and the wheel 23 and its associated clutch-ring 30 (in readiness at any opening of said latches to pick up and frictionally carry one or more manikins 31$^c$), the representation 78 is being continuously "pitched" back and forth from the "pitcher's box" 76 to the "catcher's position" 77 to travel transversely of the target-segments 49$^a$, 50$^a$, 51$^a$ and 52$^a$. These segments may be said to be arranged in a "home-plate" location.

In order to follow more closely the analogy between the task presented to a contestant by this embodiment, and the task presented to an actual baseball player who is "at the bat", it may be made a rule that unless said contestant succeeds in striking one of the target-segments 49$^a$, 50$^a$, 51$^a$ and 52$^a$ during the period measured by the time required for the representation 78 to pass transversely of the circular space defined by the outer edge of segment 49$^a$, in the course of said representation's passage from the "pitcher's box" 76 to the "catcher's position" 77,—in other words, unless said contestant succeeds in striking one of said target-segments when the "pitched ball" is "over the plate",—a segment struck by his missile will not become displaced and the apparatus accordingly will give no indication of such a striking. In this connection, attention is called to a lock-bar 100 (see Figs. 3 and 12). As best shown in Fig. 12, said lock-bar has a dependent portion which is loosely sleeved about tie-rod 18, each of the terminal portions of said lock-bar resting on top of one of said tie-rods 20 to maintain horizontal said lock-bar in all its adjustments. Lock-bar 100 is normally maintained as shown in Fig. 3, by means of the retractile spring 101. In this position of the lock-bar, it will be seen that none of the target-segments may be displaced by a missile striking thereagainst. Attached to the rear portion of said lock-bar, as is also best shown in Fig. 3, is a cable 102. The upper end of said cable is attached to the lower terminus of a lever 103 which is pivotally mounted upon a horizontal shaft 104' supported by main-frame 15. The mount 93, which is as aforesaid instrumental for "pitching" back and forth the representation 78, carries a cam 104 (as best shown in Figs. 3 and 11). Now this cam is so designed and located on the mount 93 that at the instant when, during the "pitching" of representation 78 from "pitcher's box" 76 to "catcher's position" 77, said representation first commences to overlap the circle defined by the outer edge of segment 49$^a$, the cam-nose 104$^a$ rocks the lever 103 in the direction of the arrow 103$^a$ and thereby removes lock-bar 100 from beneath teeth 58 sufficiently to permit any of the target-segments 49$^a$, 50$^a$, 51$^a$ and 52$^a$ to be displaced upon the striking thereagainst of a missile.

The length of cam 104 is so designed that at the instant the representation 78 is just leaving the confines of the circle defined by the outer edge of target-segment 49$^a$, the rear end 104$^b$ of said cam rides free of lever 103 and thereby permits spring 101 to return lock-bar 100 to its normally effective location. It may be, however, that the belt 79, and the parts associated therewith for its drive and control, should be desired to be dispensed with, and another means supplied for indicating certain predetermined intervals of time during which one of the target-segments 49$^a$, 50$^a$, 51$^a$ and 52$^a$ must be struck by a missile to cause a manikin or manikins 21$^c$ to be advanced along the "base-lines", or it may be that this means just referred to should be desired to be utilized in connection with the presence of said belt 79 and its associated parts. There is therefore provided upon driving sleeve 24 a fixedly carried and suitably insulated ring 105, carrying a segmental circuit-closer 105$^a$. The length of this circuit closer may of course be designed to suit. The function of the circuit-closer is predeterminedly to close a normally open circuit which includes the contacts 106, the wires 107, 108 and 109, the battery 110 and the light-bulb 111, the latter upon and during the closing of said circuit being adapted more intensely to illuminate the front of the structure and the target-segments 49$^a$, 50$^a$, 51$^a$ and 52$^a$.

Referring now particularly to Fig. 1 it will be seen that were the back-ground 82, the belt 79, the wall-member 16, the portions 25' of shield 25, each painted a suitable color, as green, to the eye of the spectator located a customary distance in advance of the structure the horizontally spaced relations between said back-ground, said belt and said wall-member, and the obliquity from the vertical of said belt, will not be apparent, and said back-ground, said shield, said wall-member and said belt will appear as arranged in a single vertical plane. In that case, the target-segments 49$^a$, 50$^a$, 51$^a$ and 52$^a$ may be painted a suitable contrasting color, such as red; and the diagrammatic representation of the baseball field may be established by painting the "base-point" locations 35, 36 and 37 white and the "base-lines" 35' yellow.

The operation of the machine is substantially as follows: Assume the case where the four base-runners 31 are all collected to be hidden by wall-member 16 (Figs. 1 and 3) and halted by the "home" latch 41 (Figs. 2, 3 and 6). The term "halted" is used because otherwise the base-runners would be always frictionally transported to travel clockwisely (Fig. 1) of the shield 25 (Figs. 1 and 3), due to the fact that wheel 23 and its supported clutch-ring 30 (Fig. 3) are continuously revolving; for the wheel is fixedly mounted upon sleeve 24 (Fig. 3) which is operatively connected with driving shaft 59 by means of sprocket-chain 51 (Figs. 2 and 3). While the wheel 23 is thus always revolving (but behind shield 25 and hence invisibly), the base-ball representation 78 (Figs. 1 and 3), is being visibly "pitched" back and forth, alternately up and down the apparently vertical path defined by the visible length of belt 79 which crosses the "plate" (or target) as shown in Fig. 1; for during each revolution of driving shaft 59 (Figs. 2 and 3) the gear segments 94 and 95 take turns in engaging respectively with the pinions 89 and 92 to rotate first in one direction and then in the opposite direction drum 88,—the belt 79 being always maintained taut by the weight 99 (Fig. 3) and being prevented from twisting by the fact that the slot 84 is located in shield 25, relatively of which shield the sleeve 24 is continuously rotating. The mount 93 is continuously moving through a circular path the cam 104 (Figs. 3 and 11), so that during a certain interval in each revolution of mount 93 and also during each downward vertical (Fig. 3) travel of representation 78, locking member 100 (Figs. 3 and 12) is moved to the left of its shown position in Fig. 3, and against the spring 101, due to the coöperation of said cam 104 with lever 103 (Figs. 3 and 11); thereby permitting the striking of a missile against any of the target-segments 49$^a$, 50$^a$, 51$^a$ and 52$^a$ (Figs. 1, 2, 3 and 8) so to depress the appropriate latch-tooth 58 (Figs. 8 and 2) that the appropriate one of the four cams 49$^b$, 50$^b$, 51$^b$ and 52$^b$ (Figs. 10, 8 and 2) is no longer locked against frictionally-urged rotation with cam-shaft 65. This cam-shaft is continuously revolving, due to the meshing of its bevel gear with the similar gear 55 of driving shaft 59. According to which of the target-segments was thus depressed, and consequently according to which of the four cams was thus permitted to rotate with cam-shaft 65, the target-segment struck is for a characteristic length of time (Figs. 2 and 10) held so depressed (Fig. 8). Of course meanwhile a return of the lever 103 (Figs. 3 and 11) to normal disposition will not permit the spring 101 (Fig. 3) to function to return locking member 100 to normal until the struck segment returns to normal after the particular cam then being permitted to revolve frictionally with shaft 65 (Fig. 8) has cleared the tooth 58 with which it was just previously engaged and again been frictionally halted against said tooth; one result being that almost as soon as such a struck segment does return to normal all the four cams on shaft 65 are alined as shown in Figs. 10 and 8, due to their aforesaid frictional mounting on said shaft 65, and ready for the striking of another segment. From which it will be seen that the striking of a particular target segment—when and only when the representation 78 is at a predetermined location, say when said representation is "crossing the plate"—, as distinguished from the striking of any other, maintains abnormally depressed for a different length of time not only that target-segment but also and simultaneously the common rocker-arm 46 (Figs. 2 and 3). Such a depression of the rocker-arm always opens the four latches 39, 38, and 40 (Figs. 1, 2 and 3) and also the latch 41 (Figs. 2, 3 and 6). If the segment $49^a$ is struck (whose coöperant cam $49^b$ is the shortest of the four cams on cam-shaft 65, as shown in Figs. 8 and 10), all the latches, 39, 38, 40 and 41, are opened and one base-runner 31 emerges into view (Fig. 1) and is frictionally carried by the continuously revolving wheel 23 (Fig. 3) toward the base-point $35'$ (Fig. 1); all the latches closing in time, due to the action of the spring 35 (Fig. 2) after the predetermined revolution of cam $49^b$ (Figs. 8 and 10), to cause a halting of this one base-runner by the latch 39 (Fig. 2). The auxiliary latch-tooth $41^d$ (Figs. 6 and 2) prevents, as aforesaid, more than one base-runner 31 passing beyond latch-tooth 41 upon each striking of a target-segment. If the segment $49^a$ is struck a second time, all the latches 39, 38, 40 and 41 will open as before, one more base-runner will emerge and advance toward latch 39, and the previous base-runner will advance toward the latch 38, and again all latches will close in time to give merely to the "batting" and the then "on-base" base-runners 31 a "one-base" advance apiece. The cams $50^b$ $51^b$ and $52^b$ are so designed that upon the striking of a segment $50^a$, $51^a$ or $52^a$, respectively, all the latches 39, 38, 40 and 41 will so long be held open that the "batting" and the then "on base" base-runners or base-runners 31 will simultaneously each advance either "two bases", "three bases" or "four bases."

Referring now particularly to Figs. 13, 14, 15 and 16, there is disclosed an adaptation of the present embodiment so designed as to cause the more important travels of manikins $31^c$ to be in straight paths, rather than in arcuate paths. There is shown as being present a main-frame 115, said main-frame serving as a support for the driving sleeve 24, and for the latch 39, its arm $39^b$, the latch 38, its arm $38^b$, the latch 40, its segment $40^b$, the latch 41, and its disk $41^c$. The links 42, 43 and 44, and the link-bar 45, are present as shown. Tracker-member 21 is absent, the wheel 23 being fixedly carried by sleeve 24 and having associated therewith, as described in connection with the disclosure of Figs. 1 to 12 inclusive, the clutch-ring 30. Instead of providing a circular shield 25, there is here present a substantially diamond-shaped shield 112. This shield 112 is in any suitable manner supported by convenient parts of the structure whereby during the revolutions of wheel 23 said shield remains stationary. The front face of the shield (the rear face thereof being disclosed in Fig. 13) may carry its "base-points" 35, 36 and 37, and its "base-lines" $35'$, as indicated in broken lines. It will be understood of course that preferably a wall-member similar to wall-member 16 is associated with this adaptation of the embodiment, thereby to overlap the lower portion of the shield. Wheel 23 and clutch-ring 30 here serve likewise to frictionally transport, when permitted thus to function by a predetermined opening of the latches 39, 38, 40 and 41, one or more of the manikins $31^c$. The spindle $31^b$ of each of these manikins is horizontally journaled within a sleeve 113 fixedly mounted upon one terminus of a rod 114. Each rod 114 is reciprocable longitudinally of a sleeve $31^f$ carried integrally by a post $31^g$ which is in turn integrally carried by friction-member $31^h$—this friction member $31^h$ being similar to the friction member shown in Fig. 4 as forming a part of the support 31. Each rod 114 is also preferably keyed within sleeve $31^f$. An expansible spring is coiled about each rod, serving to cause the sleeve 113 always to hug the edge of shield 112 and thereby always to cause any traveling manikin $31^c$ to travel parallel with the "base-lines". In order that the auxiliary tooth $41^d$ of latch 41 may always function, since the disk $41^c$ is also provided, not only with the disclosed latch 41, but with an auxiliary latch $41^d$ as shown in Figs. 2 and 6, each sleeve $31^f$ also carries a tail block or spacer member $31^m$.

It will thus be clear that there is disclosed as the broad basis of this invention, a shooting gallery or game of skill comprising fundamentally the novel combination, of, first, a diagram constructed substantially in accordance with a known athletic contest, second, a single means or a plurality of means for arbitrarily recording the efforts of a person testing his skill in connection therewith; and, third, a single means or a plurality of means automatically operable for graphically recording such effort in accordance with any set of governing rules adopted preferably by means of characteristic reproductions of the actual factorial movements which would take place in an actual contest.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense. It is also to be understood that the language used in the following claims is intended to cover all the generic and specific features of the invention herein described and all statements of the scope of the invention which, as a matter of language, might be said to fall therebetween.

We claim:—

1. In an apparatus of the class described, in combination, means carrying characteristic indicia suggestive of a contest; target-means; means adapted to indicate movements and positions of a factor in such contest; and means adapted to be actuated by a displacement of said target-means due to the striking of a missile thereagainst thereby to actuate said indicating means; said target-means including a plurality of elements the striking of one element whereof being adapted to cause said indicating means to give a predetermined indication and the striking of another whereof being adapted to cause said indicating means to give another predetermined indication.

2. In an apparatus of the class described, in combination, means carrying characteristic indicia suggestive of a contest; target-means; means adapted to indicate movements and positions of a factor in such contest; driving means for actuating said indicating means; a controlling latch normally preventing said driving means from actuating said indicating means and a means adapted to move said latch to permit said driving means to actuate said indicating means upon the striking of a missile against said target-means.

3. In an apparatus of the class described, in combination, means carrying characteristic indicia suggestive of a contest; target-means; means adapted to indicate movements and positions of a factor in such contest; driving means for actuating said indicating means; a controlling means normally preventing said driving means from actuating said indicating means but adapted to permit said driving means to actuate said indicating means upon the striking of a missile against said target-means, said target-means including a plurality of elements the striking of one element whereof being adapted to permit said indicating means to be actuated to give a predetermined indication and the striking of another whereof being adapted to permit said indicating means to be actuated to give another predetermined indication.

4. In an apparatus of the class described, in combination, means carrying characteristic indicia suggestive of a contest; target-means; means adapted to indicate movements and positions of a factor in such contest; driving means for actuating said indicating means; a controlling means normally preventing said driving means from actuating said indicating means but adapted to permit said driving means to actuate said indicating means upon the striking of a missile against said target, means including a plurality of concentric segments the striking of one segment whereof being adapted to permit said indicating means to be actuated to give a predetermined indication and the striking of another whereof being adapted to permit said indicating means to be actuated to give another predetermined indication.

5. In an apparatus of the class described, in combination, means carrying characteristic indicia suggestive of a contest; target-means; means adapted to indicate movements and positions of a factor in such contest; driving means for actuating said indicating means; a controlling means normally preventing said driving means from actuating said indicating means but adapted to permit said driving means to actuate said indicating means upon the striking of a missile against said target-means, said target-means including a plurality of concentric segments the striking of one segment whereof being adapted to permit said indicating means to be actuated to give a predetermined indication and the striking of another whereof being adapted to permit said indicating means to be actuated to give another predetermined indication; said segments being permanently located at a significant location.

6. In an apparatus of the class described, in combination, means carrying characteristic indicia suggestive of a contest; target-means; means adapted to indicate movements and positions of a factor in such contest; driving means for actuating said indicating means; a controlling means normally preventing said driving means from actuating said indicating means but adapted to permit said driving means to actuate said indicating means upon the striking of a missile against said target-means, said target-means including a plurality of concentric segments the striking of one segment whereof being adapted to permit said indicating means to be actuated to give a predetermined indication and the striking of another whereof being adapted to permit said indicating means to be actuated to give another predetermined indication; said segments being permanently located at a significant location relatively of the location of said indicia.

7. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval.

8. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a visible signal.

9. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and a fixedly located signal adapted to illuminate said indicia more intensely than usual.

10. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and driving means therefor.

11. In an apparatus of the class described, in combination, means carrying characteristic indicia suggestive of a contest; target means; means adapted to indicate movements and positions of a factor in such contest; and means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and driving means therefor and said signal being adapted to represent a factor in said contest.

12. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and driving means therefor and said signal being adapted to represent a factor in said contest, the travel of said signal being back and forth over a fixed path.

13. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and driving means therefor and said signal being adapted to represent a factor in said contest, the travel of said signal being back and forth over a fixed path and the interval aforesaid being measured by the time required for said signal to travel over a predetermined space in said path.

14. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and driving means therefor and said signal being adapted to represent a factor in said contest, the travel of said signal being back and forth over a fixed path and the interval aforesaid being measured by the time required for said signal to travel over a predetermined space in said path and in a predetermined direction.

15. In an apparatus of the class described, in combination, means carrying characteristic indicia suggestive of a contest; target-means; means adapted to indicate movements and positions of a factor in such contest; means adapted to be actuated by a displacement of said target-means due to the striking of a missile thereagainst thereby to actuate said indicating means; an indication adapted to signal a predetermined interval of time; and means adapted to prevent a displacement of said target-means except during said interval; said indication including a traveling signal and driving means therefor and said signal being adapted to represent a factor in said contest, the travel of said signal being back and forth over a fixed path and the interval aforesaid being measured by the time required for said signal to travel over a predetermined space in said path and in a predetermined direction, said space in said path passing transversely of said target-means.

In witness whereof, we have hereunto signed our names in the presence of two witnesses.

CHARLES HORTON.
AUGUSTUS M. HENRY.

In the presence of—
GEORGE F. MATTUCK,
JAS. P. WARD.